A. SEARLES.
Thill-Coupling.
No. 76,531. Patented April 7, 1868.
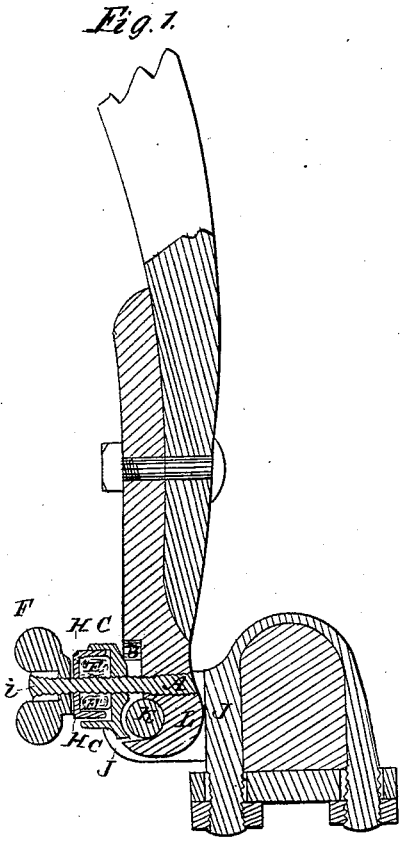
Fig. 1.
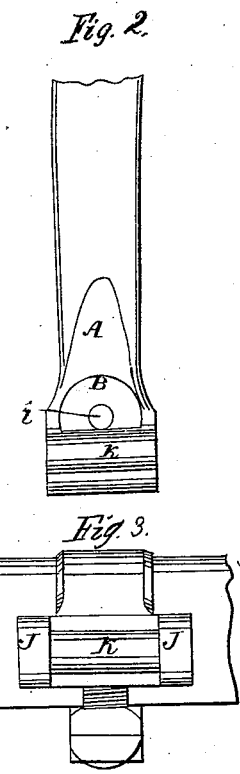
Fig. 2.
Fig. 3.
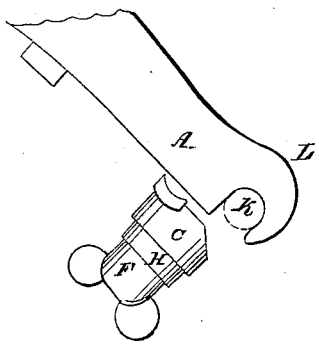
Fig. 4.
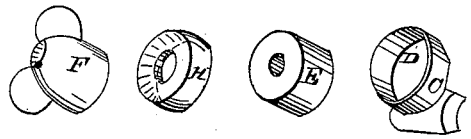
Fig. 5.  Fig. 6.  Fig. 7.  Fig. 8.
Witnesses.
Inventor.

United States Patent Office.

ANSON SEARLS, OF NEW YORK, N. Y.

Letters Patent No. 76,531, dated April 7, 1868.

---

IMPROVED SHAFT-COUPLING.

---

*The Schedule referred to in these Letters Patent and making part of the same.*

---

Be it known that I, ANSON SEARLS, of the city of New York, have invented a new and useful Improvement in Shaft-Couplings for Carriages, which I call an Improved Safety Shaft-Coupling; and I do hereby declare the following to be an exact and clear description of the same, taken together with the following accompanying drawings.

The nature of my improvements consists in making a shaft or pole-coupling in the form of an eccentric-hook, and closing the aperture of the hook with a metallic substance, held firmly in its place by a rubber or other spring, acted upon by a nut, or any other well-known means, and so arranged and combined with the shaft-clip that it may be readily detached when not in use, and will not rattle, as reference to the following figures will explain.

Figure 1 represents a side sectional view of the shaft-hook A, attached to the shaft-clip $j$ in the position with the horse attached, bringing the part L against the front of the shaft-clip. In the front part of the shaft-hook A is a recess, B, for the reception of the cap C; also, a sectional view of the spring E, metallic cap H, bolt I, and nut F.

By screwing down the nut F, it communicates a pressure to the spring E, pressing the cap C against the front part of the pin K, and drawing all the parts firmly together, rendering it impossible to become accidentally detached, and prevents, by the elasticity of the spring, any liability to vibrate or rattle.

Figure 2 represents a front view of the shaft-hook A, with the recess B and part for the pin K.

Figure 3 is a front view of the axle-clip $j$.

Figure 4 is a view of the shaft-hook A in the position when the horse is detached and the points of the shafts are on the ground, bringing the point, L, of the eccentric-shaft hook to a position, allowing the shafts to be freely unhooked without engaging with the clip $j$.

C shows the eccentric-cap turned half round, admitting the pin K to pass through the aperture so formed. The eccentric-cap C may be made to engage with the base of the nut F, so the nut will draw the cap out of the aperture of the hook when being unscrewed, and also may be acted on by any other well-known means, and made not to turn around to admit the detaching of the hook.

Figure 5 is a view of the nut F.

Figure 6 is a view of the cap H, fitting on to the spring E, to protect it from injury by the nut. A common washer may be used in its stead.

Figure 7 is a view of a rubber spring, E, fitting into the recess D of the cap C, and acted upon by the nut F, or any well-known means. Metal, or any other substance equivalent to rubber, may form this spring.

Figure 8 represents the cap C, made eccentric in form, with a recess in it for the reception of the spring E, is to close the aperture of the hook.

The bolt $i$ passes through the hook, cap C, spring, cap H receiving the nut, holding all the parts firmly together.

Having so described my improvements, I make the following claims:

1. I claim a shaft-hook, made eccentric in form, with a bolt-hole through it, and the recess B in the front side, as shown.

2. An eccentric-cap C, with the recess D, for the purposes set forth.

3. I claim the cap C, spring E, cap H, nut F, and bolt $i$, in combination, and in combination with the hook A and pin K, substantially as described, and all for the purposes set forth.

Signed this, the twenty-ninth day of October, 1867.

ANSON SEARLS.

Witnesses:
JOHN A. GIFFORD,
GEO. H. ROSE.